United States Patent [19]

Zollinger

[11] E Re. 30,920

[45] Reissued May 4, 1982

[54] YARN TENSIONING DEVICE AND METHOD

[75] Inventor: Otto Zollinger, Spartanburg, S.C.

[73] Assignee: Otto Zollinger, Inc., Spartanburg, S.C.

[21] Appl. No.: 952,937

[22] Filed: Oct. 19, 1978

Related U.S. Patent Documents

Reissue of:

[64] Patent No.: 3,753,535
Issued: Aug. 21, 1973
Appl. No.: 297,995
Filed: Oct. 16, 1972

[51] Int. Cl.[3] ..... B65H 59/22

[52] U.S. Cl. ..... 242/152.1; 226/195

[58] Field of Search ..... 242/152.1, 151, 149, 242/147 R, 147 M, 129.8, 157 R; 226/91, 97, 195

[56] References Cited

U.S. PATENT DOCUMENTS

| | | | |
|---|---|---|---|
| 112,501 | 3/1871 | Sargent et al. | 242/137.1 |
| 1,040,592 | 10/1912 | Thomas | 235/70 R |
| 1,140,185 | 10/1912 | Gerstberger | 242/152.1 |
| 1,167,636 | 1/1916 | Eastwood | 242/152.1 |
| 1,211,862 | 1/1917 | Lister | 242/152.1 |
| 1,306,148 | 6/1919 | Houghton | 242/152.1 |
| 1,372,557 | 3/1921 | Sawtell | 242/152.1 |
| 1,402,894 | 1/1922 | Sawtell | 242/152.1 |
| 1,408,560 | 3/1922 | Bingham et al. | 242/152.1 |
| 1,432,399 | 10/1922 | Land | 242/152.1 |
| 1,490,512 | 4/1924 | Hill et al. | 242/152.1 |
| 1,785,987 | 12/1930 | Stewart | 242/45 |
| 2,222,921 | 11/1940 | Van Den Bergh | 242/137.1 |
| 2,373,513 | 4/1945 | Stevenson | 242/152.1 |
| 2,492,778 | 12/1949 | Agresti et al. | 242/152.1 |
| 2,677,511 | 5/1954 | Bley | 242/137.1 |
| 3,077,313 | 2/1963 | Seney | 242/47.09 |
| 3,080,135 | 3/1963 | Steijn | 242/152.1 |
| 3,130,938 | 4/1964 | Dysart | 242/152.1 |
| 3,177,643 | 4/1965 | Halleux et al. | 57/58.86 |
| 3,182,926 | 5/1965 | Imof | 242/157 R |
| 3,309,858 | 3/1967 | Franzen | 242/152.1 |
| 3,383,072 | 5/1968 | Horvath | 242/149 |
| 3,492,778 | 2/1970 | Focke | 53/49 |

FOREIGN PATENT DOCUMENTS

| | | |
|---|---|---|
| 276617 | 12/1927 | Canada . |
| 1061239 | 7/1959 | Fed. Rep. of Germany . |
| 41573 | 9/1965 | Fed. Rep. of Germany . |
| 1785488 | 2/1972 | Fed. Rep. of Germany . |
| 855300 | 2/1940 | France . |
| 18560 | 10/1903 | Sweden . |
| 310134 | 12/1955 | Switzerland . |
| 427592 | 7/1967 | Switzerland . |
| 3847 | of 1914 | United Kingdom . |
| 299620 | 11/1928 | United Kingdom . |
| 323572 | 1/1930 | United Kingdom . |
| 677547 | 8/1952 | United Kingdom . |
| 725283 | 3/1955 | United Kingdom . |
| 805212 | 12/1958 | United Kingdom . |
| 1019206 | 2/1966 | United Kingdom . |
| 1318668 | 5/1973 | United Kingdom . |

*Primary Examiner*—Stanley N. Gilreath
*Attorney, Agent, or Firm*—Wellington M. Manning, Jr.; Luke J. Wilburn, Jr.

[57] ABSTRACT

A device is disclosed for tensioning a running length of textile yarn. The device contains a yarn passageway made up of three sections, each section having a progressively larger diameter from the inlet end of the device. A small diameter section at the entrance end of the device has a seat adjacent the inner end thereof which receives a spherical element. The medium diameter section surrounds the seat and retains the spherical element therein. The larger diameter section of the passageway is sufficiently large to enable pressurized air to pass around the spherical element without forcing the element out the end of the passageway. The wall adjacent the junction of the large and medium diameter sections is tapered so as to permit ready return of the spherical element to the medium diameter section to reside on the seat. Mounting means are also provided for securing the device to a yarn handling machine. A method for tensioning yarn is also disclosed and claimed herein where the yarn passes through the three sections of the yarn passageways and is engaged in the medium diameter section by the spherical element so as to impede the progress thereof while the spherical element is retained against lateral movement.

13 Claims, 4 Drawing Figures

YARN TENSIONING DEVICE AND METHOD

Matter enclosed in heavy brackets [ ] appears in the original patent but forms no part of this reissue specification; matter printed in italics indicates the additions made by reissue.

BACKGROUND OF THE INVENTION

Numerous devices have heretofore been produced for the tensioning of a running length of textile yarn. Further, certain of these devices have incorporated the use of a spherical element such as a ball which is received in a conical support through which yarn passes. The weight of the ball thus rests on the support, impeding the progress of yarn passing therebetween. These prior art devices have, however, been deficient for numerous reasons. For example, the majority of the devices are substantially enclosed, thus impeding feeding of yarn therethrough. Further, other of the devices are restricted to particular types of yarn. Still further, other devices operate on a principle different from that of the instant invention, through a yarn passageway and a spherical element is involved.

The present invention thus provides an improved yarn tensioning device over those of the prior art, wherein a spherical element resides on a seat and engages yarn passing therethrough so as to impede the progress of the yarn by a predetermined amount. The device of the present invention further possesses certain definite advantages over the prior art. For example, it is easily manufactured; threading of yarn is quite simple and quick; no surfaces are available for abrasion of the yarn or for collection of lint and slubs; and tension is automatically maintained without any adjustments after start up.

The prior art is devoid of any teaching or suggestion of the present invention. Exemplary of the prior art are U.S. Pat. Nos. 1,408,560 to Bingham et al.; 1,432,399 to Land; 1,490,512 to Hill et al.; 1,785,987 to Stewart; 2,222,921 to Van Den Bergh; and 2,677,511 to Bley.

SUMMARY OF THE INVENTION

It is an object of the present invention to provide an improved yarn tensioning device.

Still further, another object of the present invention is to provide an improved process for the tensioning of a running length of textile yarn.

Generally speaking, the device of the present invention comprises a housing, said housing having a yarn passageway extending therethrough, said passageway having a large diameter section, a medium diameter section and a small diameter section, and a spherical element received in said passageway and normally residing at said medium diameter section, said element having a diameter smaller than said large and medium diameter sections and larger than said small diameter section, said element further being of a predetermined size with respect to said large and medium diameter sections whereby pressurized air will not force said element from within said housing.

More specifically, the device of the present invention provides an elongated yarn passageway through a housing, with the passageway generally having straight sides therealong. Internally of the housing, the passageway tapers to a medium diameter section which extends further axially inwardly of the housing and terminates at a small diameter passageway which extends throughout the remainder of the housing. At the junction of the medium and small passageways, a seat is provided for a spherical element that is received therein. Preferably the seat is provided by a ceramic insert that is received in and extends through the small diameter passageway beyond the opposite end of the housing. The spherical element that is received within the medium diameter section of the passageway resides on the seat and is retained thereat by the wall of the medium diameter section of the passageway. Hence, while there is a loose fit between the spherical element and the medium diameter section of the passageway, there is very little play therebetween, whereby the spherical element is held against any substantial lateral movement.

Appropriate mounting means are also preferably secured to the housing and are employed to secure the device to a portion of a yarn handling textile machine. A preferred mounting means is a bracket that is integral with the housing and extends outwardly therefrom transverse to the direction of the passageway. An elongated slot that is axial with respect to the bracket extends therealong, whereby the tension device may be secured at a predetermined position on the yarn handling machine so as to receive a yarn passing therethrough. Most yarn handling machines have a large number of adjacent yarn positions thereon. Each of the positions would be thus equipped with an individual tension device according to the teachings of the present invention.

Feeding of yarn into the tension device of the present invention is quite quick and simple. Compressed air is introduced at the lower end of the device, in the small diameter section of the passageway. The compressed air overcomes the weight of the spherical element and forces the element off the seat into the large diameter passageway. While the element remains suspended in air, yarn is placed into the small diameter passageway, is picked up by the air stream and carried therewith, passing around the spherical element and out the opposite upper end of the device. The pressurized air is then removed and the spherical element falls back towards the seat and entraps the yarn between element and the seat or side wall of the passageway. Thereafter, as the yarn begins to move, the force of the moving yarn partially overcomes the weight of the spherical element and forces the element upwardly by a predetermined amount. Depending upon the speed at which the yarn is traveling, and the size of the yarn, the final placement during operation of the spherical element will vary. It should be pointed out, however, that the size and weight of the spherical element are predetermined with respect to the physical dimensions of the passageway such that when the spherical element is present in the large diameter section of the passageway, the pressurized air may pass freely therearound without sufficient force to expel the spherical element from within the housing. The upper end of the passageway may thus be unrestricted without danger of losing the spherical element during feeding.

Yarn may also be fed through the present tension device by affixing the yarn to a thin elongated instrument and pushing the instrument upwardly through the passageway, forcing the spherical element off the seat and passing therearound.

The medium diameter section of the passageway performs yet another function. In many situations it becomes desirable to angularly disposed the tension device with respect to vertical. The restricted dimensions of the medium diameter section of the passageway, both diameter and length, thus hold the spherical element over the seat and in proper position for tensioning the yarn regardless of whether the device is in a vertical position or angularly disposed.

The process of the present invention generally includes the steps of feeding a yarn through a passageway having a restricted opening therein; engaging the yarn with a freely rotatable spherical element at said restricted opening, said element applying tension thereon and retaining the spherical element adjacent the restricted opening during passage of yarn thereby.

DESCRIPTION OF THE PREFERRED EMBODIMENTS

Figure 1:
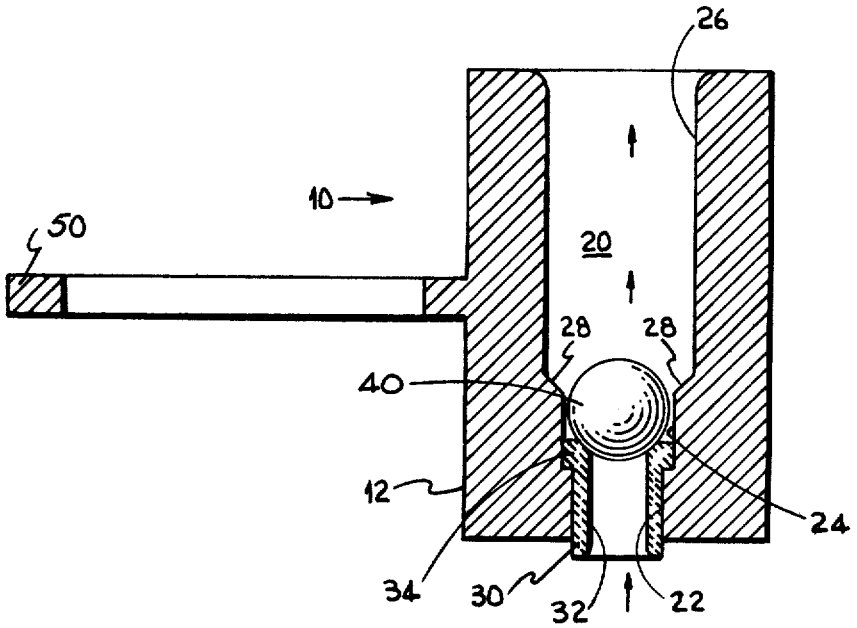
FIG. 1 is a side cross sectional view of a yarn tension device according to the present invention.
Figure 2:
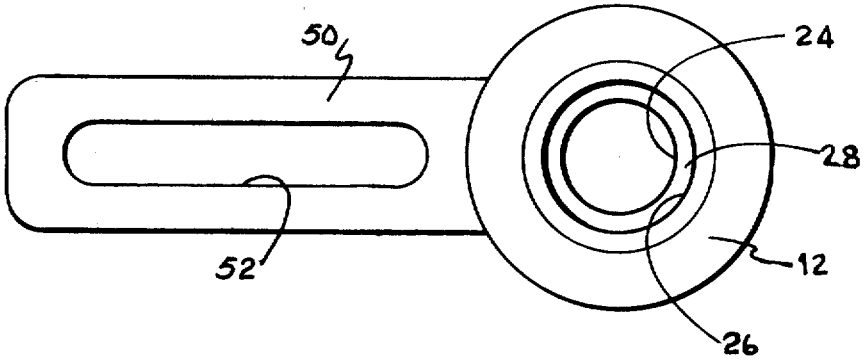
FIG. 2 is a top view of the device as shown in FIG. 1.

Making reference to the drawings, preferred embodiments of the present invention will now be described in detail. FIGS. 1 and 2 illustrate a tension control device according to the present invention generally indicated as 10. Tension control device 10 is employed on any yarn handling machine at a particular disposition with yarn passing therethrough in the direction indicated by the arrows.

Tension device 10 is made up of a housing 12 having a yarn passageway 20 extending completely therethrough. Yarn passageway 20 is comprised of a small diameter section 22, a medium diameter section 24 and a large diameter section 26. The small diameter section 22 is located at the bottom of housing 12 and has an insert 30 received therein, the purpose of which will be described hereinafter. Insert 30 contains an annular passage 32 extending therethrough and has an upper end 34 that is enlarged to the approximate size of medium diameter passageway section 24 and defines a seat thereat. All of the surfaces on insert 30 that come into contact with yarn are smooth with rounded edges, and preferably, insert 30 is manufactured of a ceramic composite that exhibits long wear characteristics when in constant engagement with a moving textile yarn.

A spherical element 40 is received in passageway 20 and resides in medium diameter section 24 on seat 34 of insert 30. Spherical element 40 is preferably a stainless steel ball of a predetermined weight and diameter relative to the diameters of medium diameter section 24 and large diameter section 26 of tubular passageway 20. In this fashion, spherical element 40 closely approximates the diameter of mid section 24 so as to be held on seat 34 against lateral movement therefrom. As such, should it become desirable to position tension device 10 angularly with respect to vertical, spherical element 40 will not roll off seat 34. In fact tension device 10 may be positioned at an angle of approximately 70 degrees on either side of vertical before element 40 moves off seat 34.

Large diameter section 26 of tubular passageway 20 has a diameter that substantially exceeds the diameter of spherical element 40, the purpose of which will be defined hereinafter. At the junction of sections 24 and 26 of passageway 20, tapered wall sections 28 are provided. The remainder of the passageway areas, are preferably straight, though the walls of section 26 may taper gradually outwardly from the junction with section 24. Hence, when spherical element 40 is up within large diameter section 26, and pressure thereon is removed, element 40 falls by gravity to the bottom of section 26, and is guided by tapered walls 28 into medium diameter section 24 to properly reside on seat 34 of insert 30.

Also making reference to FIGS. 1 and 2, a mounting means 50 is secured to housing 12 so as to facilitate securement of device 10 to the yarn handling machine. As illustrated in the Figures, the preferred embodiment is a bracket 50 which has an elongated slot 52 extending therealong. Tension device 10 may thus be adjustably mounted with respect to the source of yarn and/or the delivery point on the yarn handling machine (not shown). The particular yarn handling machines that may suitably use the device of the present invention are well within the purivew of one skilled in the art and illustration thereof is not believed necessary.

Figure 3:
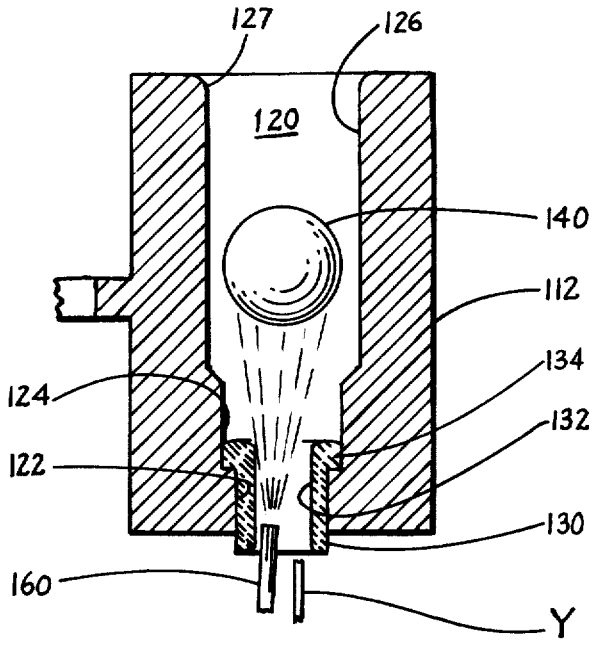
FIG. 3 is a side cross sectional view of a yarn tension device according to the teachings of the present invention illustrating a method of feeding yarn therethrough.
Figure 4:
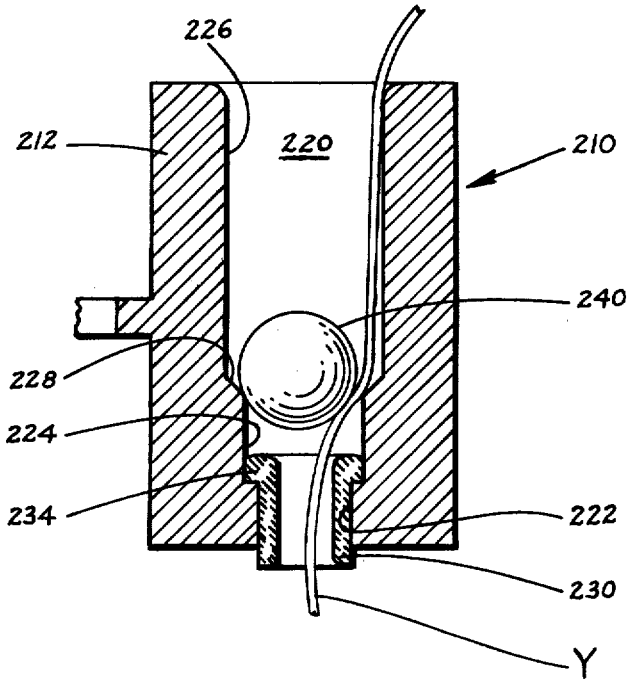
FIG. 4 is a side cross sectional view of a yarn tension device according to the present invention illustrating yarn passing therethrough.

FIG. 3 illustrates a tension device according to the present invention as might appear during feeding of a yarn therethrough. The device has a housing 112 through which extends a tubular passageway 120. Tubular passageway 120 has a plurality of sections 122, 124, and 126 in the sense as stated with respect to FIG. 1. Furthermore, an insert 130 is received in section 122 of tubular passageway 120 and defines a seat 134 in mid section 124 of passageway 120. To feed a yarn into the device, an air nozzle 160 is provided adjacent the passageway 132 through insert 130 so as to apply pressurized air against spherical element 140. The pressure of the air thus lifts spherical element 140 off seat 134 and carries same into large diameter section 126 of tubular passageway 120. When in the large diameter section 126, there is sufficient difference in the diameter of section 126 and the diameter of spherical element 140 that the pressure behind the air dissipates around spherical element 140 without forcing same out of housing 112. A restraining member is thus not required on the tension device and the upper end of passageway 120 is unobstructed. Further the outer edges 127 of section 126 are rounded to avoid damage to yarn passing thereover. So long as the pressurized air continues, however, spherical element 140 remains suspended in the air stream, and an end of yarn Y is passed upwardly through annulus 132 of insert 130 into the air stream therein. Once in the air stream, the air pressure carries yarn Y up through seat 134 and beyond spherical element 140. Thereafter, the pressurized air is removed, after which spherical element 140 returns to seat 134, entrapping yarn Y between spherical element 140 and the wall of tubular passageway 120 as shown in FIG. 4. As mentioned above, yarn may also be pushed through the device with a thin elongated instrument.

FIG. 4 thus illustrates the tension control or braking of the yarn passing through the device 210. During movement of yarn Y, a proper tension is applied thereto, while upon yarn stoppage, the element entraps yarn Y and acts as a brake. Thus as yarn Y passes through passageway 220 in housing 212, the yarn engages spherical element 240 and the inside wall of the passageway above seat 234 and passes therebetween The predetermined weight and size of spherical element 240 thus applies a set amount of tension on the yarn without producing undue drag thereon, though, if desired, more than one element 240 may be used. This is accomplished by the spherical shape of element 240 which rotates in tubular passageway 220 as yarn Y passes thereby. Moreover, as spherical element 240 is lifted off seat 234 and resides in sections 224 and 226 of tubular passageway 220, the weight of element 240 causes same to continually apply force in the downward direction. As element 240 moves around and has a tendency to move away from seat 224, gravitational force on element 240 in the direction of seat 234, constantly maintains the desired tension on yarn Y.

The tension device according to the present invention may be manufactured as desired from any suitable material that will withstand the abrasion caused by yarn passing thereover without being damaged, or without causing damage to the yarn. Plastic materials are very suitable due to the ease of use in manufacture of the device and the economics thereof. Injection molding is thus quite acceptable as a manufacturing technique for producing the instant tension device. As mentioned above, however, a ceramic composite insert is preferred due to the expected wear at that particular part of the device, along with a stainless steel spherical element.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. A tension device comprising:

a. a housing, said housing having a yarn passageway extending therethrough, said yarn passageway having a large diameter section and a small diameter section;

b. an insert received in said small diameter section of said passageway and having an opening therethrough, said insert defining an uninterrupted seat around said opening in said large diameter section of said passageway to receive a spherical element and hold said spherical element out of contact with walls of said passageway when no yarn is passing therethrough; and c. a spherical element receivable in said large diameter section of said passageway, said spherical element having a diameter less than the length of said large diameter section of said passageway and said large diameter section of said passageway having a diameter adjacent said seat to prohibit substantial lateral movement of a spherical element received thereat whereby said spherical element continuously controls tension of a yarn passing thereby[.] *said passageway being smooth surfaced and substantially unrestricted upwardly from said insert for a distance sufficient to permit substantially unrestricted upward movement of said spherical element during tensioning of a yarn.*

2. A yarn tension device as defined in claim 1 wherein said large diameter section includes a medium diameter portion located adjacent said seat [means] *and a large diameter portion above the medium diameter portion.*

3. A yarn tension device as defined in claim 2 wherein the large diameter [section] *portion* tapers inwardly to said medium diameter portion and thereat extends downwardly to said seat [means].

4. A yarn tension device as defined in claim 2 wherein said large diameter section has rounded edges at the top thereof.

5. A yarn tension device as defined in claim 1 comprising further mounting means secured to said housing.

6. A yarn tension device as defined in claim 5 wherein said mounting means extends outwardly from said housing and has an elongated slot therein.

7. A yarn tension device as defined in claim 1 wherein a plurality of spherical elements are received in said passageway, one of said spherical elements being receivable at said seat [means] and the remainder of said spherical elements being receivable thereabove.

8. A yarn tension device comprising:

a. a housing, said housing having an elongated yarn passageway therethrough, said passageway having a first large diameter section, a second medium diameter section and a third small diameter section;

b. an insert received in said small diameter section, said insert having an opening therethrough and defining a seat in said medium diameter section around said opening to receive a spherical element and hold said spherical element out of contact with the walls of said passageway when no yarn is passing therethrough, said insert being uninterrupted around the periphery of said seat; and c. a spherical element receivable in said medium diameter section at said seat, said spherical element being larger in diameter than said small diameter section of said passageway and smaller in diameter than said medium and large diameter sections of said passageway, said passageway extending at least completely above said spherical element when said spherical element is received at said seat[.] *said passageway being substantially unrestricted upwardly from said insert for a distance sufficient to permit substantially unrestricted upward movement of said spherical element during tensioning of a yarn.*

9. A yarn tension device as defined in claim 8 wherein said passageway sections are integral.

10. A yarn tension device as defined in claim 8 wherein said spherical element is sized with respect to said passageway to permit passage of pressurized air therearound during feeding of yarn thereby without being forced out of said housing.

11. A yarn tension device as defined in claim 8 wherein a plurality of spherical elements are received in said passageway, one of said spherical elements being receivable at said seat and the remainder of said spherical elements being receivable thereabove.

*12. A tension device comprising:*

*(a) a housing, said housing having a yarn passageway extending therethrough, said yarn passageway having a large diameter section and a small diameter section;*

*(b) an insert received in said small diameter section of said passageway and having an opening therethrough, said insert defining an uninterrupted seat around said opening in said large diameter section of said passageway to receive a spherical element and hold said spherical element out of contact with walls of said passageway when no yarn is passing therethrough; and*

*(c) a spherical element receiveable in said large diameter section of said passageway, said spherical element having a diameter less than the length of said large diameter section of said passageway, said large diameter section of said passageway having a diameter adjacent said seat to prohibit substantial lateral movement*

*of a spherical element received thereat whereby said spherical element continuously controls tension on a yarn passing thereby, said large diameter section of said passageway having smooth walls therealong and being unrestricted therealong for at least a length above said seat to receive at least two spherical elements therein and permit substantially unrestricted upward movement of said spherical element during tensioning of a yarn.*

*13. A tension device as defined in claim 12 wherein said large diameter section of said passageway is substantially unrestricted at least substantially along the length of the housing.*

* * * * *